(12) United States Patent
Hiramatsu

(10) Patent No.: US 7,013,025 B2
(45) Date of Patent: Mar. 14, 2006

(54) IMAGE CORRECTION APPARATUS

(75) Inventor: Naoko Hiramatsu, Kyoto (JP)

(73) Assignee: Minolta Co., Ltd., Osaka (JP)

(*) Notice: Subject to any disclaimer, the term of this patent is extended or adjusted under 35 U.S.C. 154(b) by 739 days.

(21) Appl. No.: 09/985,091

(22) Filed: Nov. 1, 2001

(65) Prior Publication Data
US 2002/0061142 A1 May 23, 2002

(30) Foreign Application Priority Data
Nov. 22, 2000 (JP) ............................ 2000-355853

(51) Int. Cl.
G06K 9/00 (2006.01)

(52) U.S. Cl. .................. 382/103; 382/167; 382/274; 348/220.1

(58) Field of Classification Search ............... 382/103, 382/107, 117, 118, 167, 168, 171, 205, 206, 382/266, 274, 275, 164, 128; 348/169, 220.1, 348/222.1, 246, 251; 358/518, 519, 520, 358/522, 532, 538; 396/140
See application file for complete search history.

(56) References Cited

U.S. PATENT DOCUMENTS

| 5,034,888 | A | * | 7/1991 | Uehara et al. .............. 600/101 |
| 5,249,037 | A | * | 9/1993 | Sugiyama et al. .......... 348/452 |
| 5,703,638 | A | * | 12/1997 | Ohta et al. ............... 348/220.1 |
| 5,712,680 | A | * | 1/1998 | Hieda ...................... 348/220.1 |
| 5,774,754 | A | * | 6/1998 | Ootsuka ..................... 396/380 |
| 5,943,444 | A | * | 8/1999 | Shimizu et al. ............ 382/236 |
| 5,974,272 | A | * | 10/1999 | Kiesow et al. ............. 396/140 |
| 6,011,900 | A | * | 1/2000 | Kato et al. ................. 386/108 |
| 6,028,981 | A | * | 2/2000 | Hirasawa et al. .......... 386/117 |
| 6,069,994 | A | * | 5/2000 | Kozuki et al. ............. 386/121 |
| 6,084,939 | A | * | 7/2000 | Tamura .................... 378/98.2 |
| 6,198,504 | B1 | * | 3/2001 | Nobuoka ................. 348/208.3 |
| 6,359,649 | B1 | * | 3/2002 | Suzuki .................... 348/220.1 |
| 6,377,301 | B1 | * | 4/2002 | Hieda .................... 348/231.99 |
| 6,493,027 | B1 | * | 12/2002 | Ohta et al. ............... 348/220.1 |
| 6,556,180 | B1 | * | 4/2003 | Furuhashi et al. ............ 345/87 |
| 6,584,219 | B1 | * | 6/2003 | Yamashita et al. ......... 382/154 |
| 6,678,000 | B1 | * | 1/2004 | Sakata ....................... 348/369 |
| 6,686,957 | B1 | * | 2/2004 | Johnson et al. .......... 348/222.1 |
| 6,687,418 | B1 | * | 2/2004 | Ludwig ..................... 382/280 |
| 6,694,051 | B1 | * | 2/2004 | Yamazoe et al. .......... 382/167 |
| 6,747,689 | B1 | * | 6/2004 | No et al. ................ 348/207.2 |
| 6,788,813 | B1 | * | 9/2004 | Cooper ..................... 382/167 |
| 6,801,250 | B1 | * | 10/2004 | Miyashita ............... 348/220.1 |
| 6,816,191 | B1 | * | 11/2004 | Shyu ...................... 348/231.6 |

(Continued)

FOREIGN PATENT DOCUMENTS

JP 05-130635 5/1993

Primary Examiner—Barry Choobin
(74) Attorney, Agent, or Firm—Buchanan Ingersoll PC

(57) ABSTRACT

The nature of the target image to be corrected is identified in regard to whether it is a still image or a moving image, and where it is a moving image, correction is performed with regard to the entire image, and where it is a still image, the image is divided into multiple sections and correction is carried out with regard to the image in each such section.

15 Claims, 16 Drawing Sheets

U.S. PATENT DOCUMENTS

| | | | |
|---|---|---|---|
| 6,819,359 B1 * | 11/2004 | Oda | 348/247 |
| 6,833,868 B1 * | 12/2004 | Meynants et al. | 348/272 |
| 2001/0040626 A1 * | 11/2001 | Ohta et al. | 348/220 |
| 2002/0057346 A1 * | 5/2002 | Hirasawa et al. | 348/208 |
| 2002/0140829 A1 * | 10/2002 | Colavin et al. | 348/231.99 |
| 2002/0145678 A1 * | 10/2002 | Suzuki et al. | 348/675 |
| 2002/0191828 A1 * | 12/2002 | Colbeth et al. | 382/132 |
| 2003/0030729 A1 * | 2/2003 | Prentice et al. | 348/220.1 |
| 2003/0112340 A1 * | 6/2003 | Okada et al. | 348/220.1 |
| 2003/0142955 A1 * | 7/2003 | Hashizume et al. | 386/52 |
| 2004/0101053 A1 * | 5/2004 | Jung | 375/240.16 |

* cited by examiner

IMAGE CORRECTION APPARATUS

RELATED APPLICATION

This application is based on patent application No. 2000-355853 filed in Japan, the entire content of which is hereby incorporated by reference.

BACKGROUND OF THE INVENTION

1. Field of the Invention

This invention relates to a technology for correcting still images and moving images.

2. Description of the Related Art

Various methods have been proposed to date for the correction of still images using a computer. Types of such correction include color fog correction, contrast correction, sharpness correction, lightness correction and saturation correction. In addition, a technology to appropriately perform color fog correction and contrast correction using scene determination in which the state of the scene displayed in the still image has also been proposed.

Two methods are available for the correction of moving images: a method in which correction is performed on a real time basis during image shooting, and a method in which correction is carried out using a computer after image shooting. Because a number of operations are required for correcting a moving image, only simple correction is made using either method. Against this backdrop, technologies for correction have been developed separately for still images and moving images, and still images and moving images have been processed using different application programs (or mechanisms).

Incidentally, digital still cameras and digital video cameras (hereinafter collectively referred to as 'digital cameras') that are capable of capturing both still images and moving images are being marketed these days. A digital camera generally has only simple correction functions whether it is used for capturing a still image or a moving image. Furthermore, as computers become more and more sophisticated, opportunities for an individual to handle moving images are increasing.

Where a person who owns a still image or a moving image makes a preferred correction to the image, ordinarily, the image data is first read into a computer for processing. However, as described above, different application programs are required for still images and moving images, and moreover, only very basic corrections can be made to moving images.

SUMMARY OF THE INVENTION

An object of the present invention is to resolve the problems identified above.

A further object of the present invention is to provide an apparatus that can perform correction suited for still images and for moving images.

A further object of the present invention is to provide an apparatus that can perform correction suited for still images and for moving images by appropriately using for the correction of moving images advanced correction techniques used for the correction of still images.

These and other objects are attained by an image correction method having a step of determining, based on the data for the image designated as the object of correction, whether or not the image is a moving image or a still image, a step of performing a first correction to the designated image if the designated image is determined to be a still image as a result of the above determination, and a step of performing a second correction, which comprises a simplified version of the first correction, to the designated image if the designated image is determined to be a moving image as a result of the above determination.

These and other objects are also attained by an image correction apparatus having a blanket correction means for performing uniform correction to the entire image if the image to be corrected is a moving image, and a local correction means for performing localized correction of the same types as such correction if the image to be corrected is a still image.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawings.

DESCRIPTION OF THE PREFERRED EMBODIMENT

Figure 1:
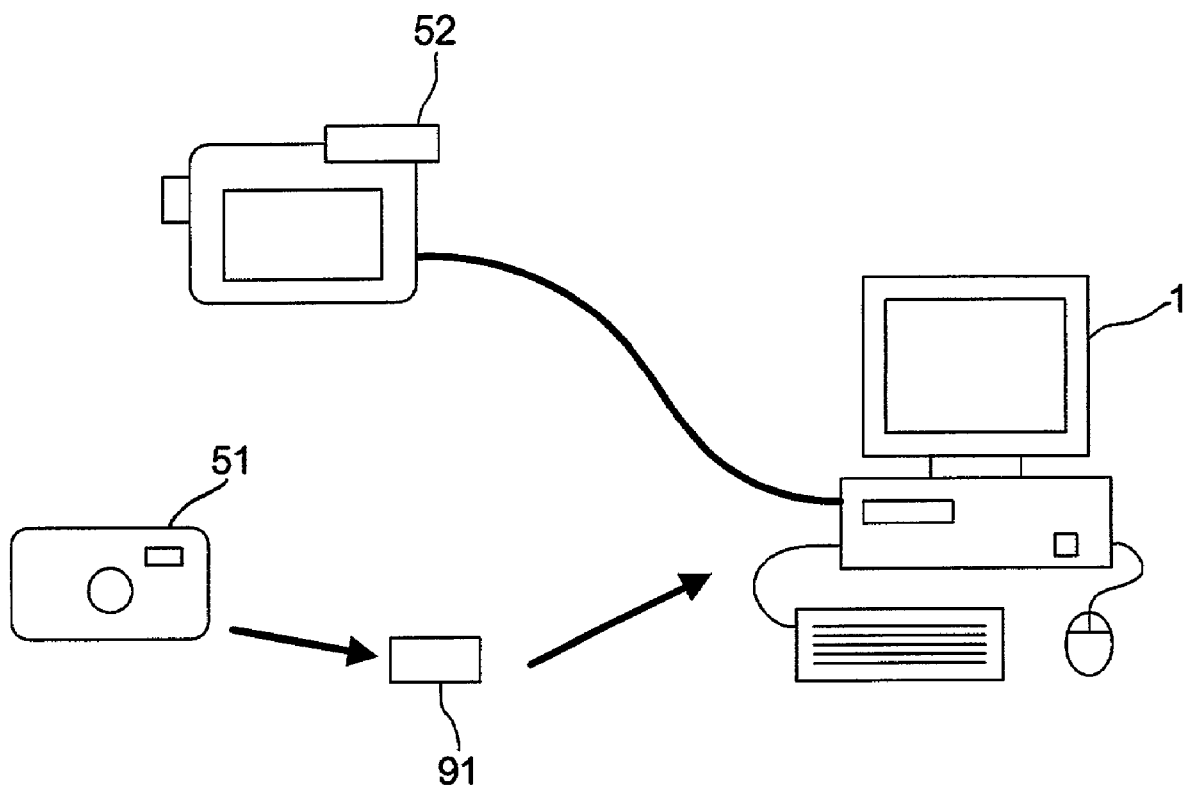
FIG. 1 is an illustration showing the external view of a computer.

<First embodiment> FIG. 1 shows a computer 1 that comprises one embodiment of an image correction apparatus. As shown in FIG. 1, the computer 1 incorporates still images from a digital still camera 51 via a memory card 91 or moving images from a video camera 52 via a cable. The video camera 52 may be of the type that transmits analog signals as image signals or of the type that outputs digital signals as image signals. A moving image input board that is suited to the type of image signals transmitted is mounted in the computer 1. Naturally, a video player may be connected instead of the video camera 52.

Figure 2:
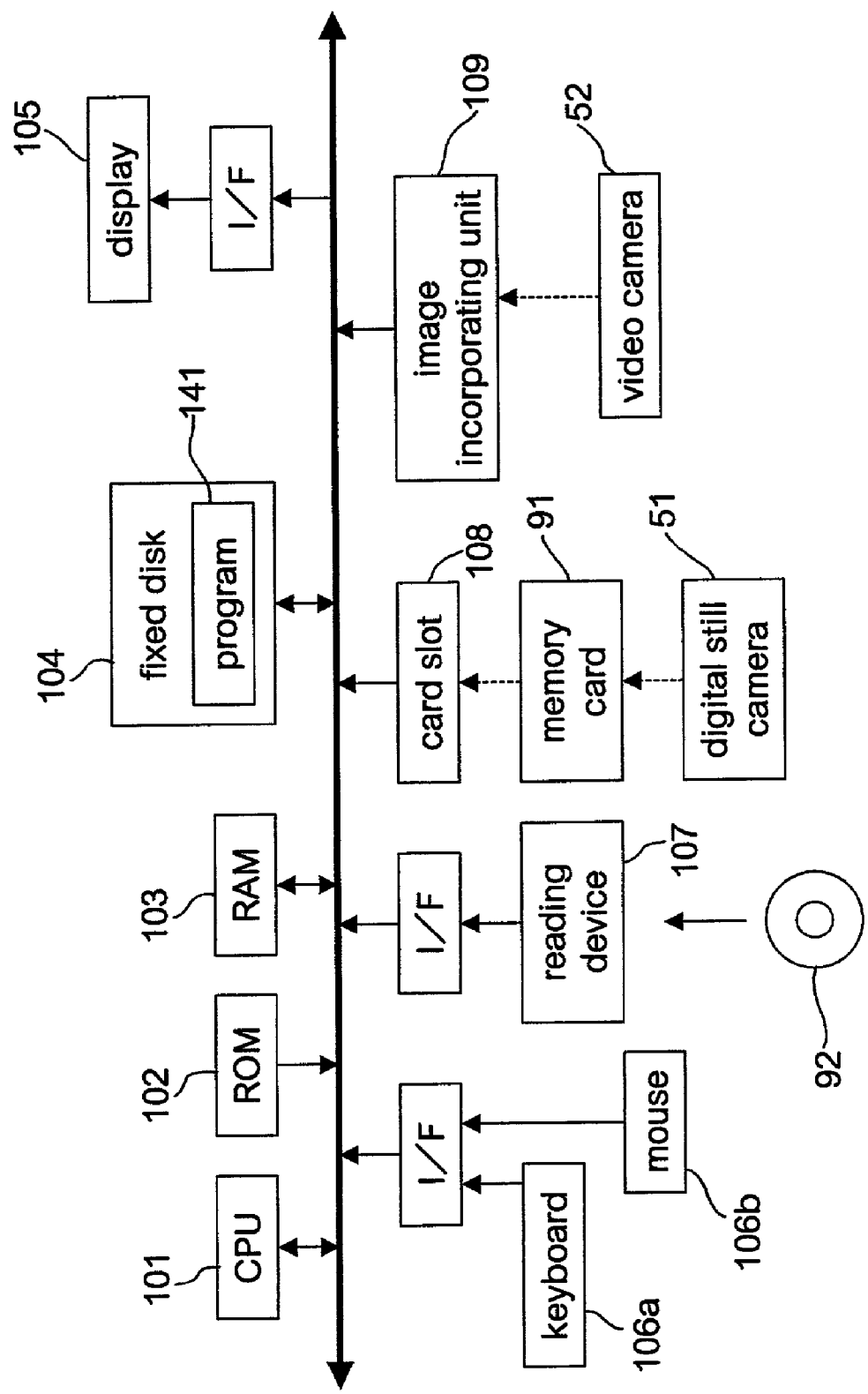
FIG. 2 is a block diagram showing the construction of the computer.

FIG. 2 is a block diagram showing the internal construction of the computer 1. The computer 1 has the construction of a general computer system comprising a CPU 101, which performs various operations, a ROM 102, in which the basic programs are stored, and a RAM 103, in which various information is stored, with these three components being connected to a bus line. Also connected to the bus line via an interface (I/F) if necessary are a fixed disk 104 that stores information, a display 105 that displays various information, a keyboard 106a and a mouse 106b that receive input from the user, a reading device 107 that reads information from a recording medium 92 comprising an optical disk, a magnetic disk, a photomagnetic disk or the like, a card slot 108 through which still image data is incorporated from the digital still camera 51 via a memory card 91, and an image incorporating unit 109 that incorporates as digital data moving image signals from the video camera 52.

A moving image editing program 141 is read in advance from the recording medium 92 into the computer 1 via the reading device 107, and is stored in the fixed disk 104. When the program 141 is copied onto the RAM 103 and the CPU 101 executes processing in accordance with the program residing in the RAM 103, correction of a still image or a moving image (hereinafter referred to as a 'target image') is performed.

Figure 3:
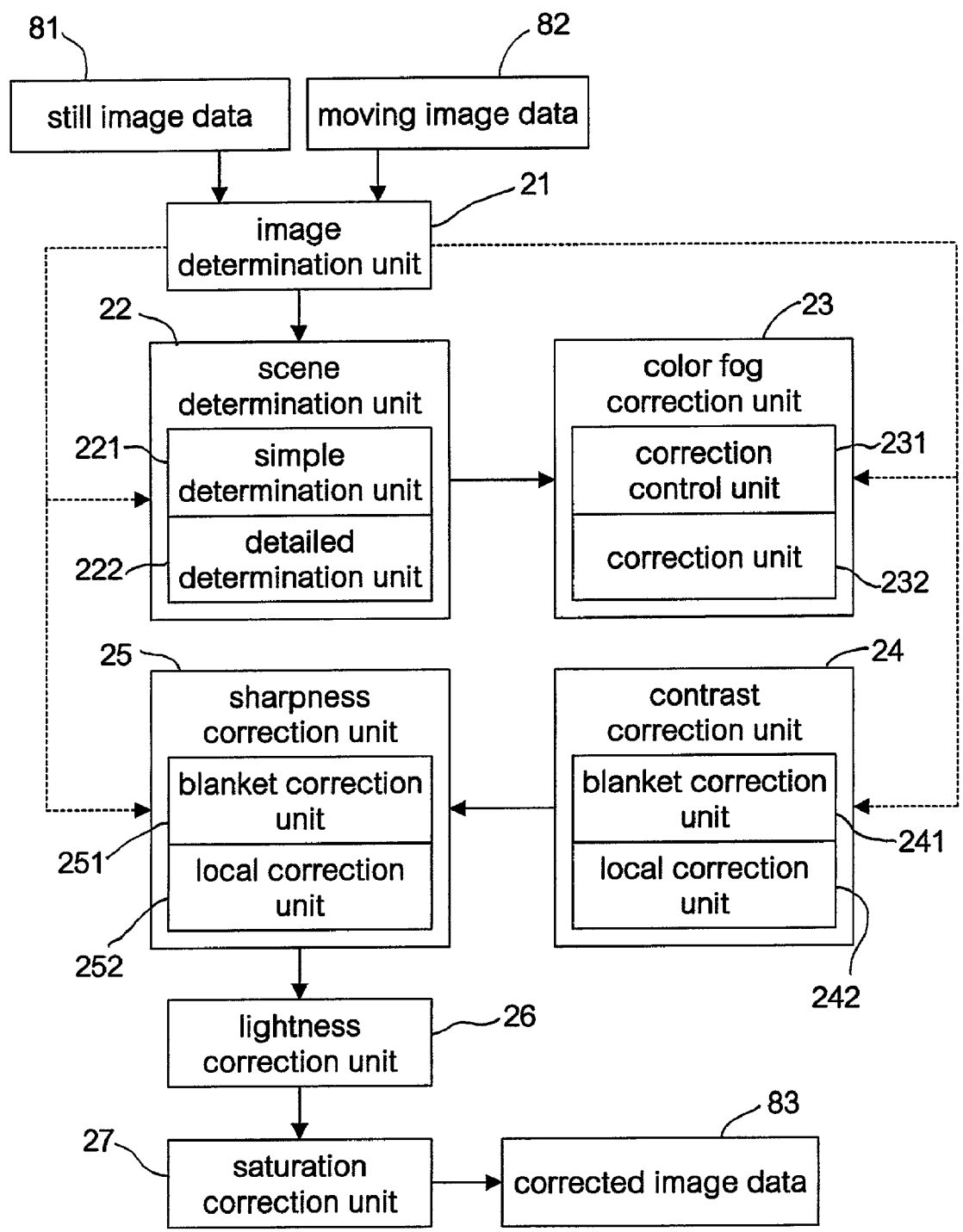
FIG. 3 is a block diagram showing the functional construction of the computer.

FIG. 3 is an illustration showing the construction of the functions performed by the CPU 101, ROM 102, RAM 103, etc., when the CPU 101 operates in accordance with the program. In other words, the CPU 101, etc., provide the functions of an image determination unit 21, a scene determination unit 22, a color fog correction unit 23, a contrast correction unit 24, a sharpness correction unit 25, a lightness correction unit 26 and a saturation correction unit 27.

Still image data 81 or moving image data 82 is input to the image determination unit 21, which determines whether the target image is a still image or a moving image. The determination regarding the type of target image, however, may be made via operation by the user. The scene determination unit 22 includes a simple determination unit 221 that performs simple determination regarding the characteristics of the image (which means each frame image in the case of a moving image, and the same applies in the following description of the correcting operation), i.e., the features of the scene shown by the image, and a detailed determination unit 222 that performs detailed determination regarding the characteristics of the image. The color fog correction unit 23 includes a correction control unit 231 that selects one method from among multiple color fog correction methods, and a correction unit 232 that executes the correction.

The contrast correction unit 24 includes a blanket correction unit 241 that performs uniform correction of the entire image and a local correction unit 242 that divides a still image into multiple areas and performs correction to each area. The sharpness correction unit 25 also includes a blanket correction unit 251 and a local correction unit 252. The lightness correction unit 26 adjusts the lightness of the image, and the saturation correction unit 27 adjusts the saturation of the image. Corrected image data 83 is generated for a still image or a moving image by these correction units. The result of the determination by the image determination unit 21 is input to the scene determination unit 22, color fog correction unit 23, contrast correction unit 24 and sharpness correction unit 25. These correction units each perform processing in accordance with the type of target image.

Figure 4:
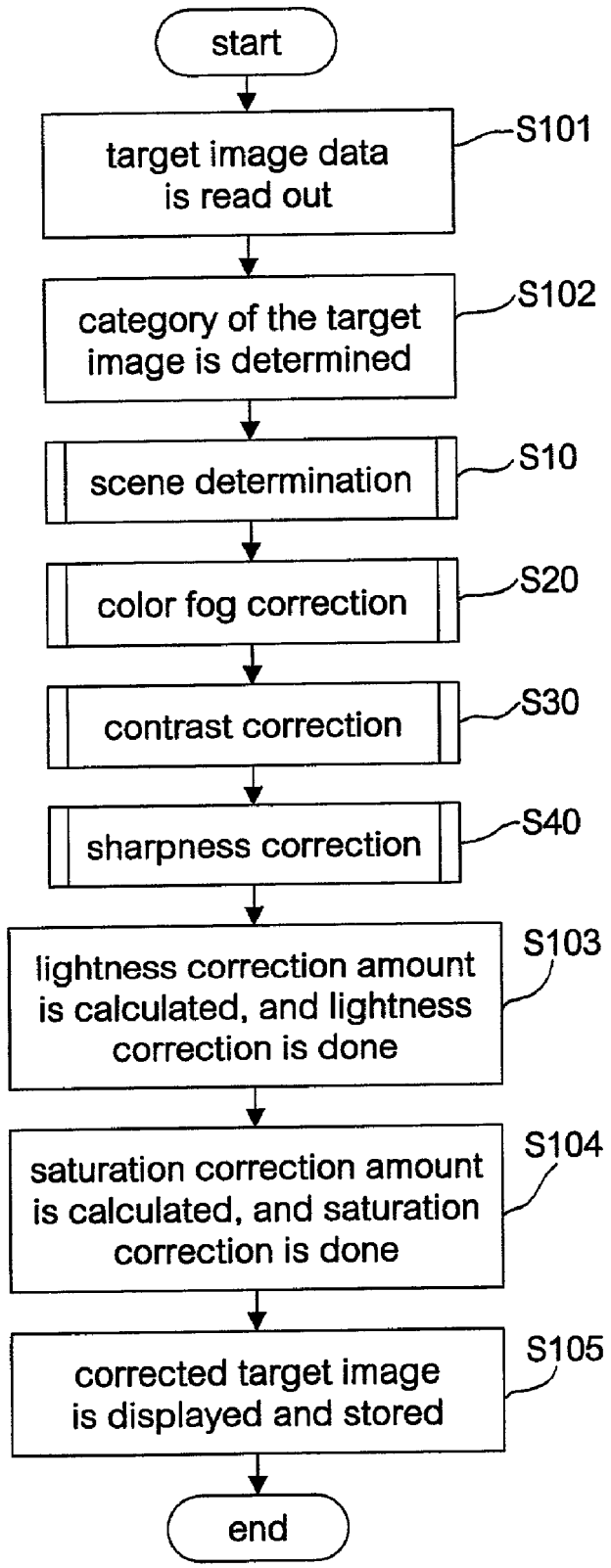
FIG. 4 is a flow chart of an image correction routine (first embodiment)

FIG. 4 is a flow chart of an image correction routine executed by the computer 1. The still image data 81 or moving image data 82 stored in the fixed disk 104 in advance is first read to the RAM 103 (step S101), and it is determined by the image determination unit 21 whether the target image is a still image or moving image (step S102). The result of the determination is stored in the RAM 103 for use during subsequent processing. The determination regarding whether the target image is a still image or moving image is made based on the attributes of the still image or moving image data (or file). Specifically, the target image is determined to be a still image or moving image based on the attribute information included in the data or the information included in the extension or header of the file.

Figure 5:
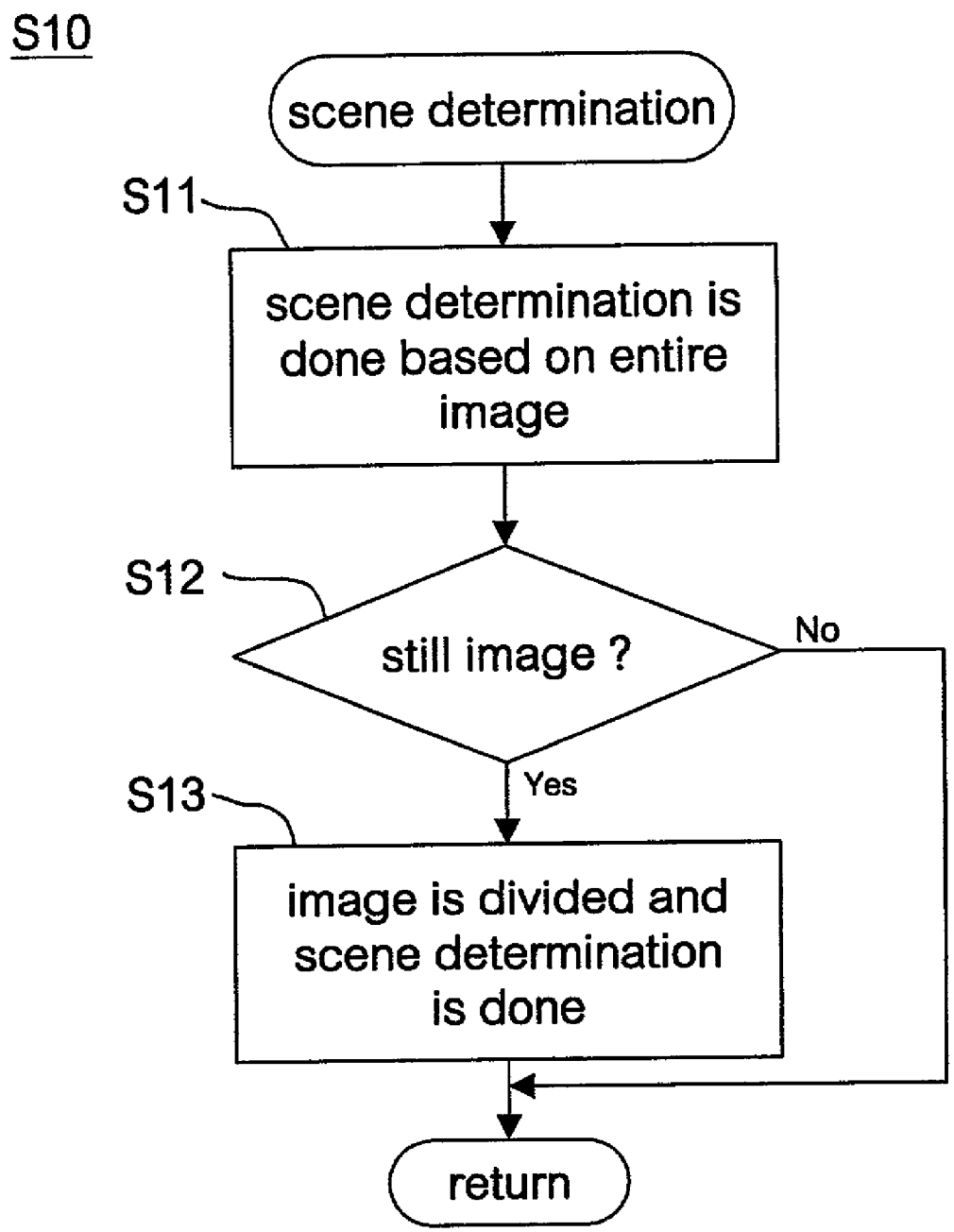
FIG. 5 is a flow chart of a scene determination routine.

Scene determination for the target image is then carried out by the scene determination unit 22 (step S10). FIG. 5 is an illustration showing the sequence of the operation performed by the scene determination unit 22. In scene determination, the simple determination unit 221 checks for the existence of color fog and seeks the status of contrast based on the pixel values throughout the image (step S11).

The color fog determination and contrast determination processes carried out by the simple determination unit 221 will be described below based on a specific example. In color fog determination, the R, G and B values of each pixel are converted into H (hue), S (saturation) and L (lightness) values. Pixels having a lightness value within a certain range are then extracted in order to eliminate pixels having a lightness value that is too high or too low. A hue histogram is sought regarding the extracted pixels. As a result, if 85% or more of all pixels exist in the first range of hue (for example, in a range incorporating 20 classes where there are 0 to 255 classes of hue), it is determined not that color fog is present but that an object having an unbalanced color distribution was captured in the image.

Where 80% or more of all pixels exist in a second range of hue (for example, in a range incorporating 50 classes of hue), it is determined that color fog is present. In other instances, determination is further carried out regarding the existence of green fog. Because green fog exhibits a pixel distribution spanning a larger range in the hue histogram than fog of any other color, if a number of pixels equaling or exceeding a certain number exist in a range incorporating 90 classes centered around green, for example, green fog is determined to exist.

Where color fog other than green fog is present, the hue of the color fog is sought based on the second range of hue (i.e., the range in which 80% or more of the pixels exist). This hue is then converted into the RGB color space, and among R, G and B, the color that has the highest value is determined to be the color giving rise to the color fog (hereinafter referred to as the 'fog color'). In the case of green fog, G (green) is determined to be the fog color.

In color fog determination, it may be determined solely whether or not color fog correction is needed, or alternatively, the hue giving rise to the color fog as well as the degree of the color fog present may be sought. The extent to which processing is to be carried out may be changed depending on the nature of the subsequent process of color fog correction, where appropriate. In addition, in the case of still images, it may be further determined as well whether or not the image comprises a scene incorporating special conditions (such as a sunset, for example).

In contrast determination, a lightness histogram for the entire image is sought. If the resulting range of lightness of all pixels exceeds a certain upper limit value, the image is determined to have high contrast, and while if the range exceeds a certain lower limit value, the image is determined to have low contrast. In other cases, the image is determined to have normal contrast.

However, where a still image is determined to have normal contrast, the lightness distribution and the average lightness value are further sought. If the resulting distribution is small and the average value is high, it is determined that a localized light area exists in the image (hereinafter referred to as 'localized light area presence'), and if the distribution is small and the average value is small, it is determined that a localized dark area exists in the image (hereinafter referred to as 'localized dark area presence').

As described above, the simple determination unit 221 makes a determination regarding the characteristics of the entire image, i.e., the existence of color fog and whether the image has high contrast, low contrast or normal contrast (as well as localized light area presence and localized dark area presence in the case of a still image) based on all pixel values of the still image or each frame image of the moving image.

Following the scene determination by the simple determination unit 221, where the target image is a still image, more detailed scene determination is further carried out by the detailed determination unit 222 (steps S12 and S13). In detailed scene determination, the entire area of the image is first divided into multiple areas, each comprising 8×8 pixels, for example, and determination is made regarding the contrast and sharpness of the still image.

Contrast determination by the detailed determination unit 222 is carried out when the simple determination unit 221 determines the contrast of the image to be normal. A lightness histogram is first sought for each area resulting from the division of the entire image area (hereinafter referred to as a 'section'), and the lightness corresponding to the largest number of pixels is deemed the lightness of the section.

Subsequently, continuous sections that have a lightness lower than a certain value are deemed a dark region. If the dark region comprises a certain percentage of all sections (20%, for example), it is determined that the image may have been captured against the light source, and the average lightness value for the adjacent sections surrounding the dark region is sought. Where the difference between the average lightness value for the surrounding sections and the average lightness value for the dark region does not reach a certain value, it is determined that the image is dark in its entirety but was captured in a normal fashion.

Where the difference between the average lightness value for the surrounding sections and the average lightness value for the dark region equals or exceeds the certain value, a saturation histogram is drawn for all of the pixels, and a saturation distribution variance is obtained. Where the saturation distribution variance does not reach a certain value, it is determined that the image shows a scene captured against the light source, because in the case of a scene captured against the light source, the saturation distribution variance is small because the saturation is low due to the blurry background and the main object that is in focus in the image is also in the shadow.

In sharpness determination, edges are extracted from the image using a differential filter or band filter on each section. By averaging the intensity of the high-frequency components of the edges, the sharpness of the section is obtained. By comparing the obtained sharpness with a predetermined value, it is determined for each section whether the degree of sharpness is appropriate.

Figure 6:
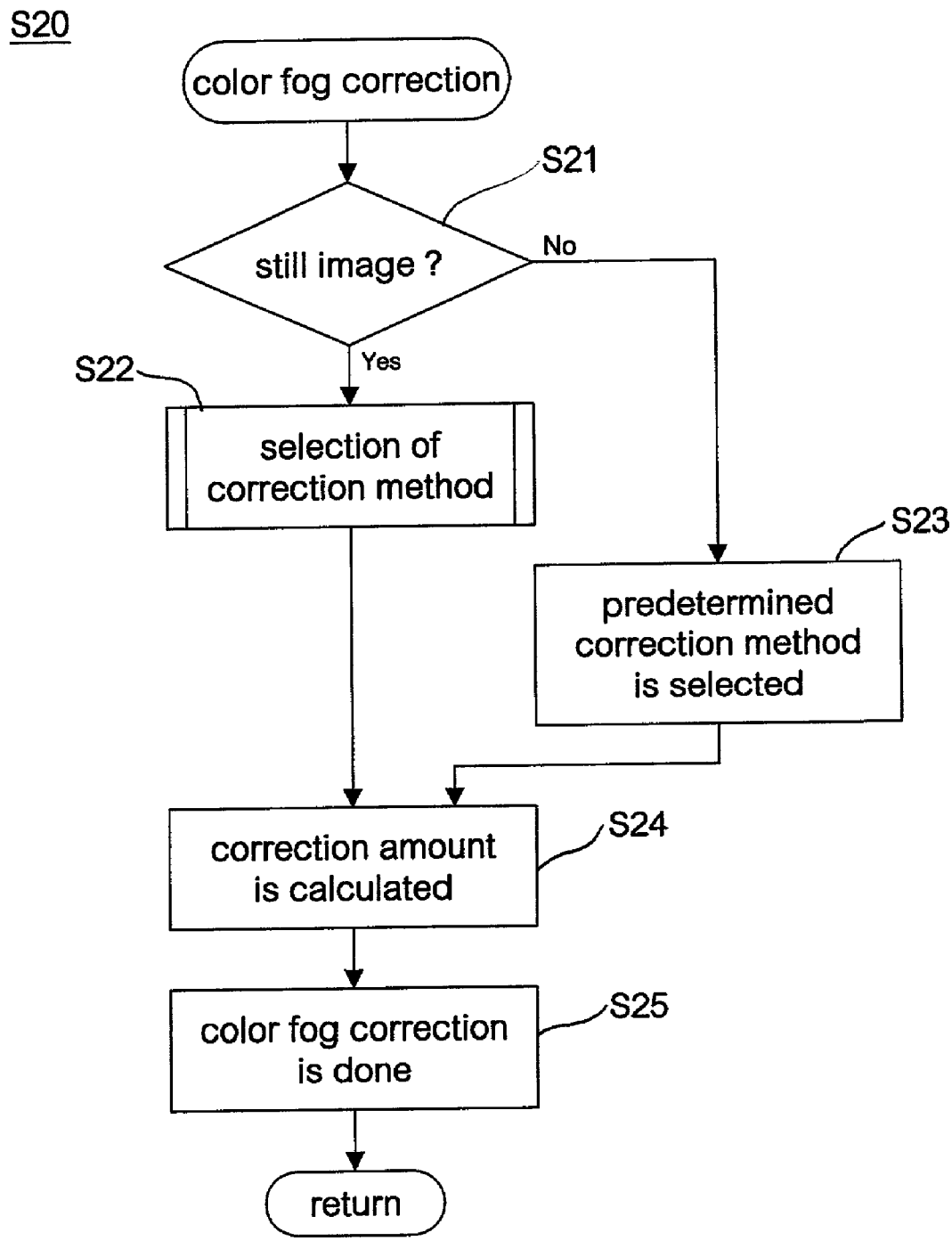
FIG. 6 is a flow chart of a color fog correction routine.

As described above, the detailed determination unit 222 determines the characteristics of the image based on the pixel values of multiple areas of the still image. When scene determination is completed, the data and determination results regarding the target image are input to the color fog correction unit 23, which carries out color fog correction (step S20 in FIG. 4). FIG. 6 is a flow chart showing the color fog correction routine.

The correction unit 232 included in the color fog correction unit 23 is capable of performing correction using one of multiple correction methods. The correction method to be used is determined by the correction control unit 231. Where the target image is a still image, the correction control unit 231 selects a correction method based on the result of the scene determination (steps S21 and S22). Where the target image is a moving image, on the other hand, the correction method to be used is predetermined, such that selection of a correction method does not take place (step S23). Subsequently, the color fog correction amount corresponding to the correction method is calculated, and color fog correction is carried out by the correction unit 232 (steps S24 and S25).

The first through third correction methods, which comprise examples of correction methods that can be executed by the correction unit 232, will be described below. Under the first correction method, histograms for R, G and B values are created for all of the pixels of the image, and two histograms are vertically enlarged so that the peak values for each histogram (the number of pixels) match. The histogram having the largest area is then fixed, and the remaining two histograms are moved in a parallel fashion so that the peak positions of each histogram match. Using each histogram's amount moved and rate of enlargement (i.e., the amount of correction), the R, G and B values for each pixel are corrected. The amount by which to move a histogram may be sought instead so as to maximize the area over which the three histograms overlap.

Under the second correction method, the fog color obtained in scene determination is used. Where, among R, G and B values, the color deemed the fog color has the largest value for a pixel, the fog color of the pixel is reduced until it equals the second largest value for the pixel. For example, if the fog color is R (red) and the R, G, and B values of the pixel are 200, 180 and 130, respectively, the correction amount is 20, and the R value is changed from 200 to 180. Through this correction, the excessively large color component is reduced. The R, G and B values are then inverted, and converted into Y, M and C values. In the same manner as with the R, G and B values, the largest value among the Y, M and C values is reduced to become equal to the second largest value, and the Y, M and C values are converted back to R, G and B values. Through this operation, compensation is made for the excessively small color component in the RGB color space.

According to the third correction method, R, G and B histograms are created regarding the entire image, and each histogram is enlarged along the horizontal axis (the pixel value axis) so that the histogram is distributed throughout the entire range along the horizontal axis. For example, where the range of the horizontal axis of the histogram is 0 to 255, the histogram is enlarged horizontally so that the smallest R, G or B pixel value becomes 0 and the largest value becomes 255. The pixel values are then corrected in accordance with the rate of enlargement (i.e., amount of correction) of the histogram, and the darkest pixel in the image is deemed black and the lightest pixel is deemed white.

The correction unit 232 is capable of performing any one of the first through third correction methods, and where the target image is a still image, correction is carried out using the first, second or third correction method or a correction method combining any of them (such as a correction method combining the first correction method to the second correction method, for example).

Figure 7:
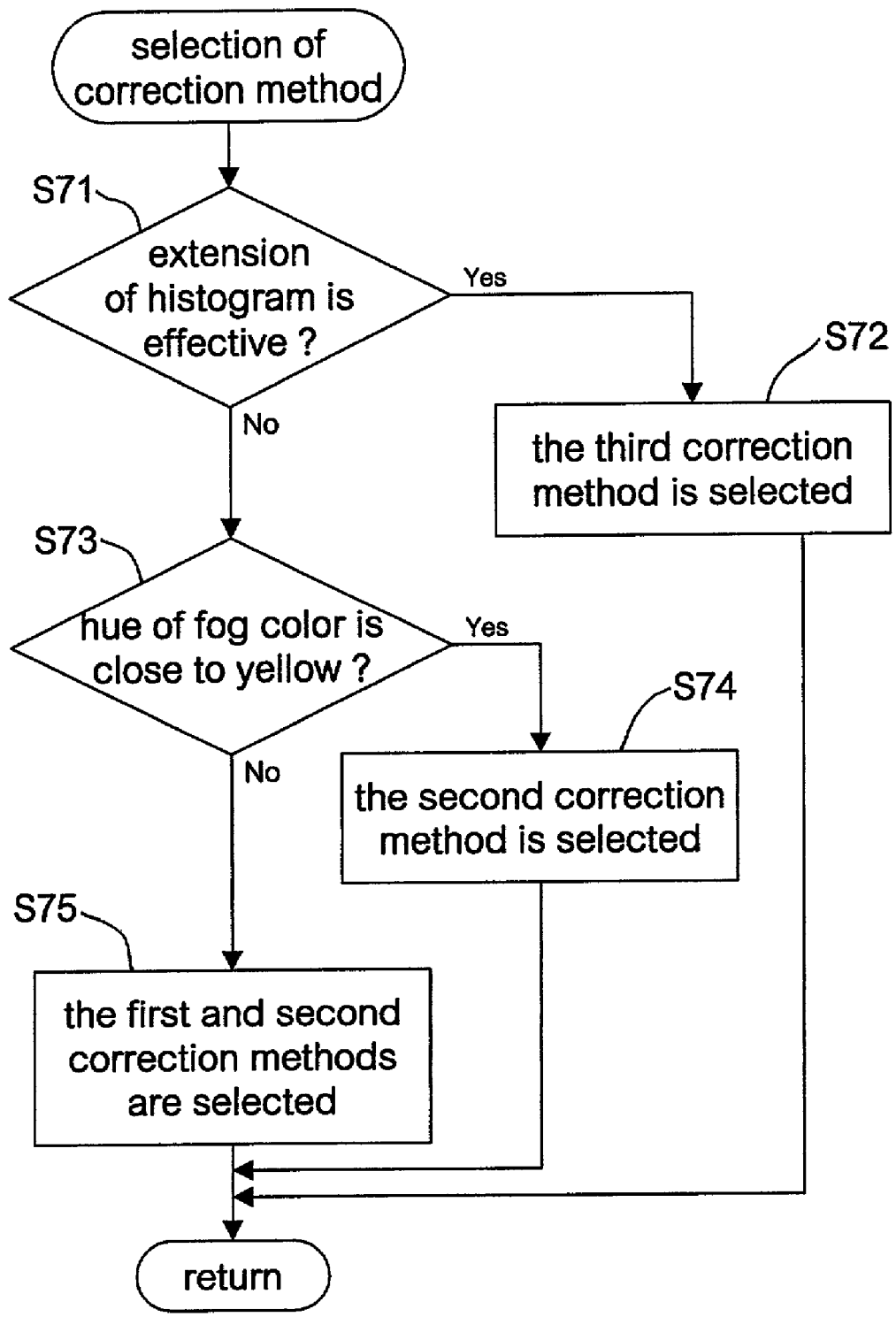
FIG. 7 is a flow chart of a correction method selection routine.
Figure 8:
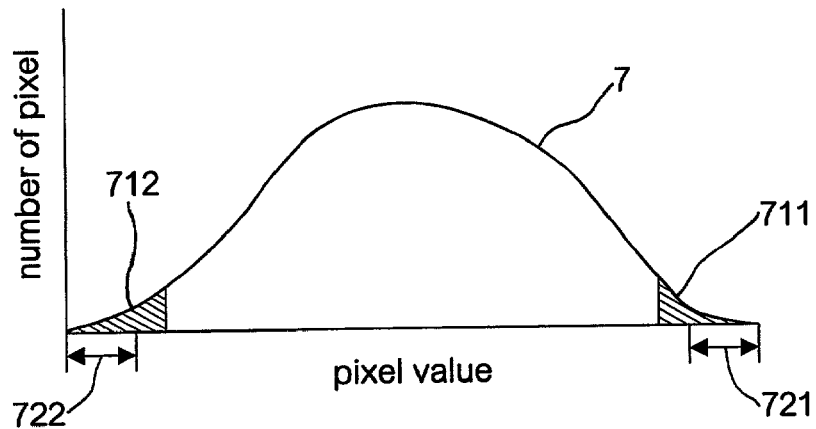
FIG. 8 is a histogram regarding pixel values.

FIG. 7 is a flow chart of a routine for the correction control unit 231 to select a correction method when the target image is a still image. R, G and B histograms are created for the pixels, and it is determined whether correction based on extension of the histogram (i.e., the third correction method) is effective (step S71). FIG. 8 is a histogram of R pixel values. Where 711, which represents the top 5% of the pixels having a large R value, overlaps with 721, which is the top 10% range along the horizontal axis (pixel value axis) of the histogram 7, and the bottom 5% of the pixels having a small R value overlaps with 722, which is the bottom 10% range along the horizontal axis of the histogram 7, it is determined that extension of the R histogram 7 is not needed. Similarly, it is also determined whether extension is needed regarding the G and B histograms. Where it is determined for any of the histograms that extension is needed, color fog correction based on histogram extension is deemed effective, leading to the selection of the third correction method described above (step S72).

Where it is determined that histogram extension is not effective, all pixel values are converted into H, S and L values, and an H (hue) histogram is generated. Where 35% of the pixels exist in the yellow area, i.e., in the range of 150 to 180 when the hue is normalized by 360, it is determined that the fog color is yellow (step S73). The second method that eliminates unwanted colors is effective for yellow fog, so that the second correction method is selected by the correction control unit 231 (step S74).

Where the fog color is not yellow, the first correction method is selected together with the second correction method (step S75). Correction is then carried out by the correction unit 232 using the second correction method, followed by correction using the first correction method, and the histogram peaks for each color are matched. Through this operation, reduction in lightness due to removal of the fog color other than yellow is prevented.

In the case of moving images, it is predetermined that, of the three correction methods described above, the first correction method will be carried out. The second correction method is not applied to moving images because this method entails substantial color change. The third correction method is not applied to moving images because the state of correction changes as the object changes and the continuity in a moving image is lost because the degree of correction varies from light areas in the image to dark areas.

Figure 9:
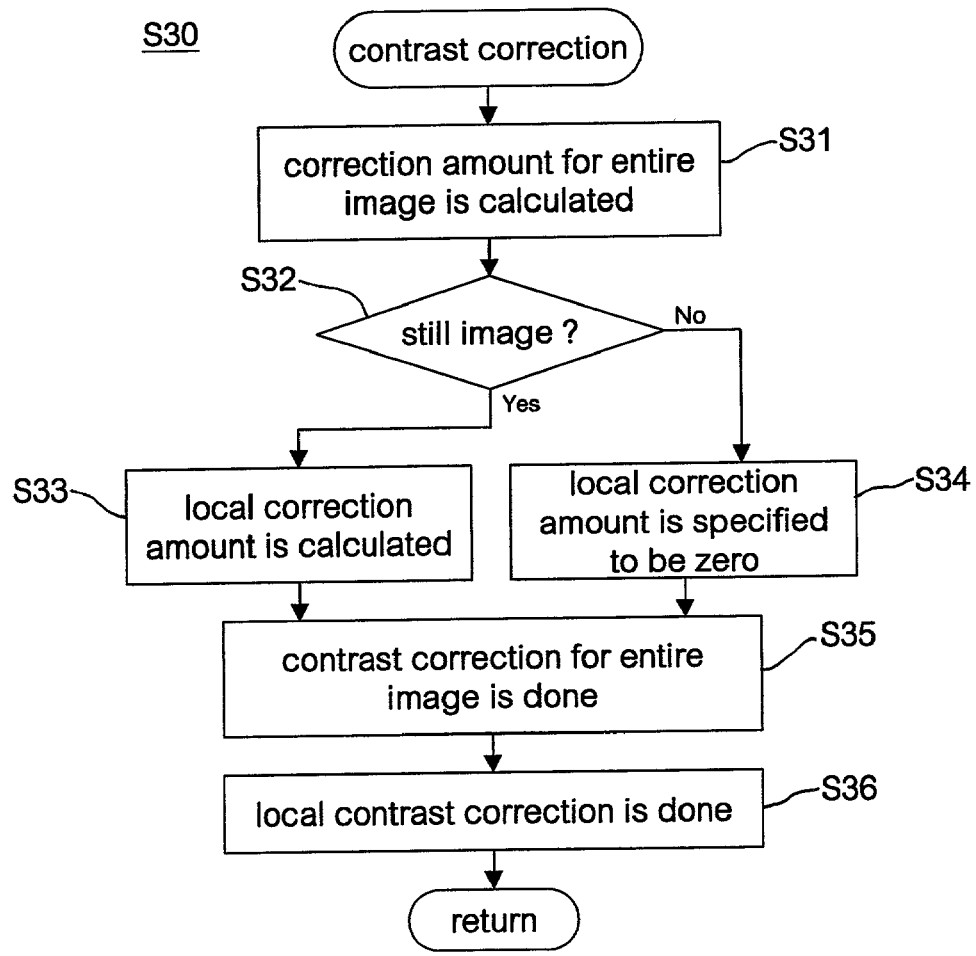
FIG. 9 is a flow chart of a contrast correction routine.
Figure 10:
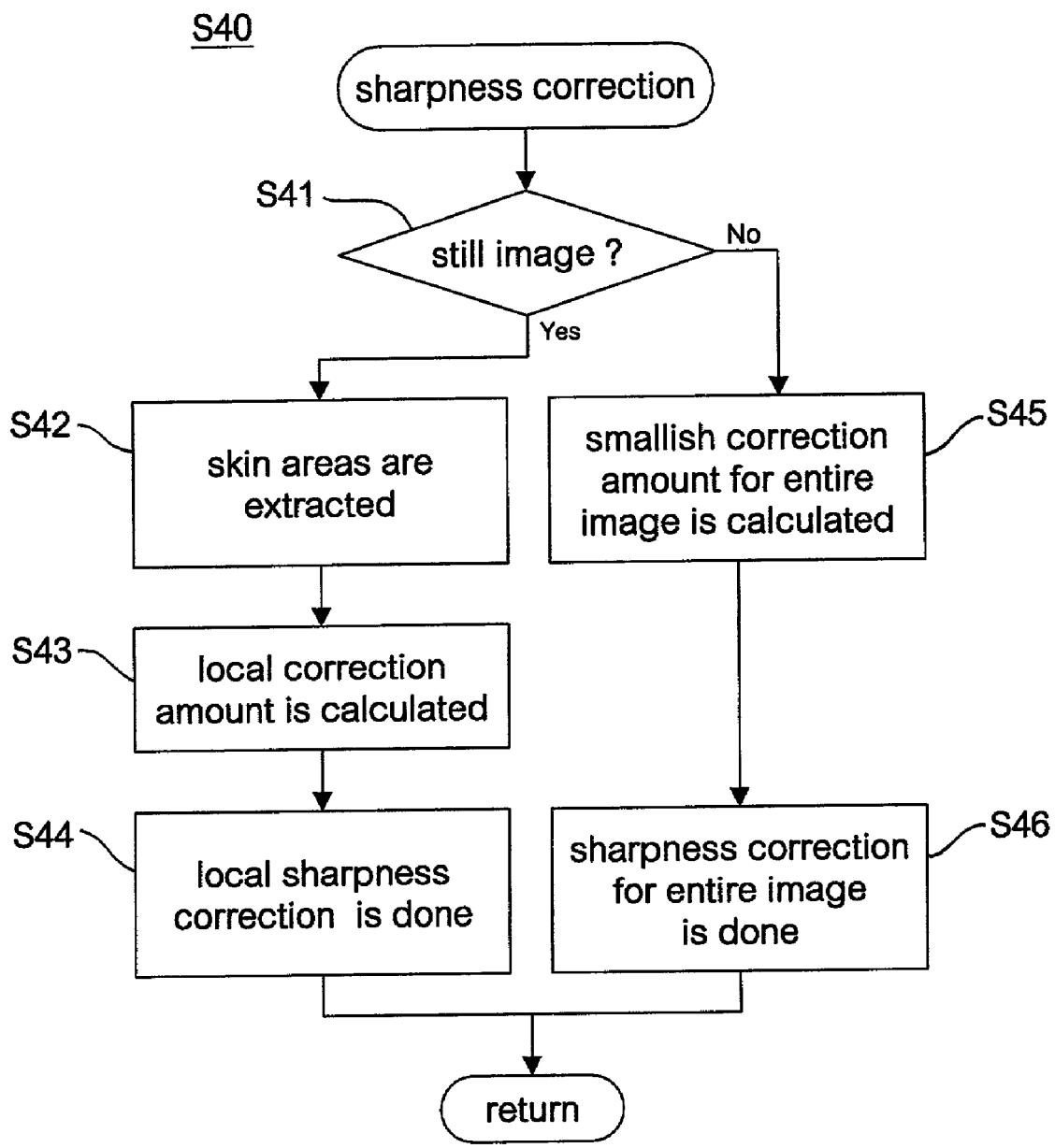
FIG. 10 is a flow chart of a sharpness correction routine.

When color fog correction is completed, contrast correction is then carried out by the contrast correction unit 24 (step S30 in FIG. 4). FIG. 9 is a flow chart of the contrast correction routine.

The contrast correction amount regarding the entire image is first sought by the blanket correction unit 241 based on the result of the scene determination (step S31). The correction amount is given as a γ-curve for correction. There are multiple γ-curves available using the LUT format. For example, where it is determined in scene determination that the image has high contrast or was captured against the light source (in the case of still images only), a γ-curve that darkens areas that are too light and lightens excessively dark areas is selected. In the case of low contrast, a γ-curve that emphasizes the contrast is selected. Where the target image is a still image and localized light area presence is determined to exist in scene determination, a γ-curve that darkens excessively light areas is selected. Conversely, where it is determined that localized dark area presence exists, a γ-curve that lightens excessively dark areas is selected.

Where the target image is a still image, the local correction amount for each section is further sought by the local correction unit 242 (steps S32 and S33). For example, where the image was captured against the light source, a correction amount (i.e., a γ-curve) to emphasize the contrast is sought for areas that were determined to comprise a dark region in scene determination. In the case of localized light area presence or localized dark area presence, a correction amount to emphasize the contrast is sought for areas other than the sections that are extremely light or dark.

A γ-curve that offers fine adjustment of the contrast may be sought based on the lightness histogram for each section when normal, high or low contrast is determined to exist in scene determination. In the case of moving images, on the other hand, local correction amounts are specified to be zero (step S34). Consequently, the local correction unit 242 is virtually disabled with regard to moving images.

When the correction amount for the entire image and local correction amounts have been sought, the pixel values are converted based on the blanket correction amount, so that the contrast regarding the entire image is uniformly corrected (step S35). Fine adjustment of the contrast regarding each section then takes place using the local correction amount (step S36). In the case of a moving image, because local correction amounts are set to be zero, no local contrast correction is carried out. The blanket contrast correction may be performed immediately after the blanket correction amount is obtained, or contrast correction may take place after the blanket correction amount and the local correction amounts are synthesized.

Following contrast correction, sharpness correction is performed by the sharpness correction unit 25 (step S40 in FIG. 4). Where the target image is a still image, the local correction unit 252 carries out sharpness correction for each section, which was created in scene determination, and where the target image is a moving image, the blanket correction unit 251 performs correction for each entire frame image.

In the case of a still image, areas that correspond to the skin (hereinafter referred to as 'skin areas') are extracted from the image (steps S41 and S42). Skin areas are extracted by comparing each area of the image with a predetermined skin color. Once skin areas have been extracted, the correction amount for each section is sought in accordance with the sharpness of each section, which was obtained during scene determination (step S43). When this is done, if a section includes a skin area, a small correction amount is set for that section in order to express smooth skin. Sharpness correction is then carried out for each section based on the individually sought correction amount (step S44). The correspondence between the sharpness and the correction amount is provided in advance in the form of a table.

In the case of a moving image, a sharpness correction amount for the entire image is sought (step S45). That is, the sharpness of the entire image is first sought, and a corresponding sharpness correction amount for that image is set. The sharpness correction amount for a moving image is set to be smaller than the correction amount ordinarily set for a still image (it is acceptable if the correction amount is set to be zero). Thereafter, uniform sharpness correction is carried out for each entire frame image using the sought correction amount.

After sharpness correction, the lightness correction unit 26 seeks based on the post-correction target image the average lightness value regarding the entire image as well as a lightness correction amount, and carries out lightness correction (step S103 in FIG. 4). A lightness correction amount is selected from among lightness correction amounts representing three different lightness levels, and through this correction, the lightness of the entire image is increased or decreased, or is maintained at the current level (no correction).

Furthermore, the saturation correction unit 27 carries out saturation correction to the target image (step S104). In saturation correction, the saturation correction unit 27 seeks the average saturation value regarding the entire image based on the post-lightness correction image, and selects one correction amount from among three correction amounts representing three different levels, i.e., large, small and no correction. The selected correction amount is further adjusted using the lightness and saturation of each pixel, and a correction amount for each pixel is thereby obtained. Using the correction amount thus obtained for each pixel, saturation correction takes place for each pixel.

When all types of correction are completed, the post-correction target image is displayed in the display 105, and is stored in the fixed disk 104 where appropriate (step S105).

As described above with reference to the computer 1 pertaining to the first embodiment, using the computer 1, some of the advanced correction techniques for still images may be applied in the correction of moving images, offering appropriate correction of moving images. Furthermore, some correction techniques may be shared between still images and moving images.

Therefore, in the computer 1, the same routines may be included in one program for the correction of still images and moving images, so that still images and moving images may be appropriately corrected without having to provide two different programs. In other words, the appropriate correction of moving images may be provided simply by selecting correction routines and making a few additions for moving images after an advanced correction program is developed for still images.

In addition, each correction unit shown in FIG. 3 or the parts thereof may comprise a dedicated electric circuit. In this case, a number of circuits that may be shared for both correction of still images and correction of moving images may be created. This enables simplification of the construction of the computer 1. Specifically, because the blanket correction unit 241 of the contrast correction unit 24 is responsible for the blanket correction of still images and frame images of moving images, and the local correction unit 242 is responsible for more specific correction of still images, the blanket correction unit 241 may function as a component used for correction of both still and moving images. Furthermore, the steps to select a γ-curve for contrast correction may be shared between blanket correction and local correction. Moreover, when performing contrast correction of still images, blanket correction may be omitted.

In the sharpness correction unit 25, the blanket correction unit 251 performs correction regarding moving images and the local correction unit 252 carries out correction regarding still images. While these are different routines, the same steps are used to seek the sharpness correction amount. In addition, local sharpness correction may take place with regard to still images after blanket correction is performed by the blanket correction unit 251. By providing a process (or a correction unit) for blanket correction of at least moving images and a process (or a correction unit) for local correction of the same type regarding still images, both still images and moving images undergo appropriate correction while some steps of the routines may be shared between the still images and moving images.

In the computer 1, part of the scene determination that enables advanced correction of a still image is applied to the correction of moving images. Therefore, appropriate correction is provided for moving images while some correction steps are shared between still images and moving images. Similarly, for color fog correction, an appropriate correction method is selected from among multiple correction methods regarding still images, while a predetermined correction method is used for moving images. As a result, advanced correction is provided for still images while some correction steps are shared between still images and moving images.

Figure 11:
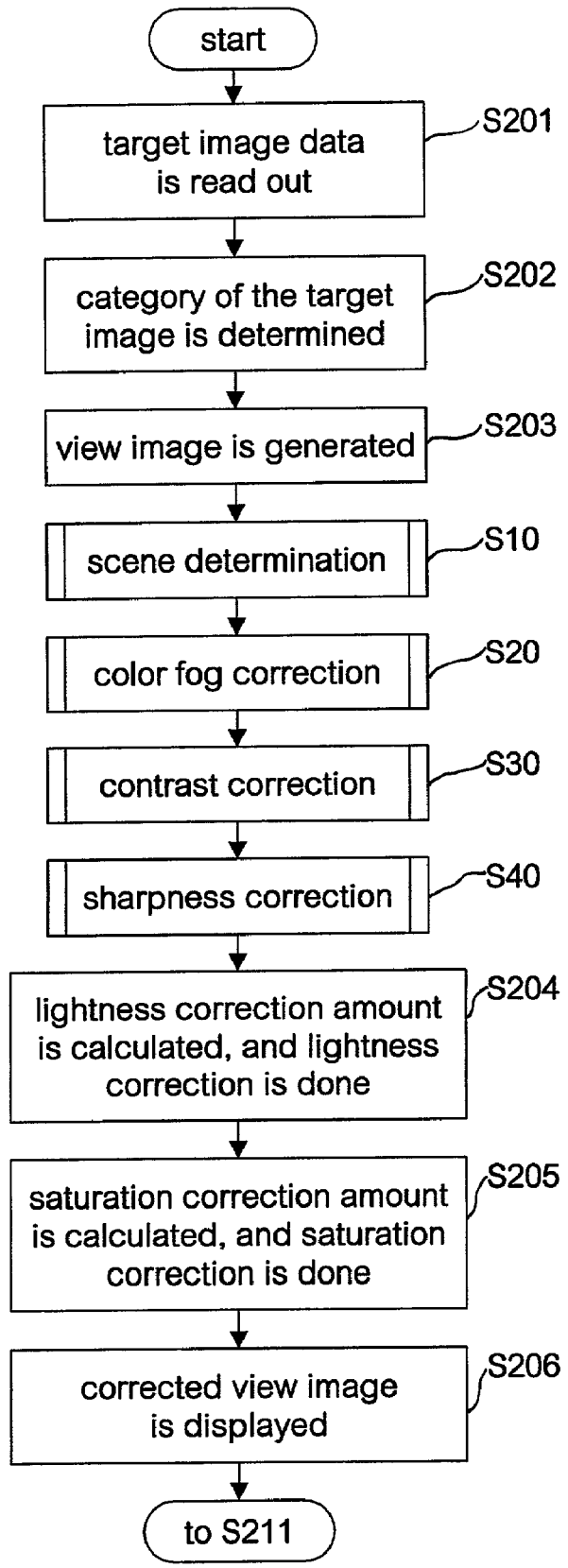
FIG. 11 is a flow chart of part of an image correction routine (second embodiment)
Figure 12:
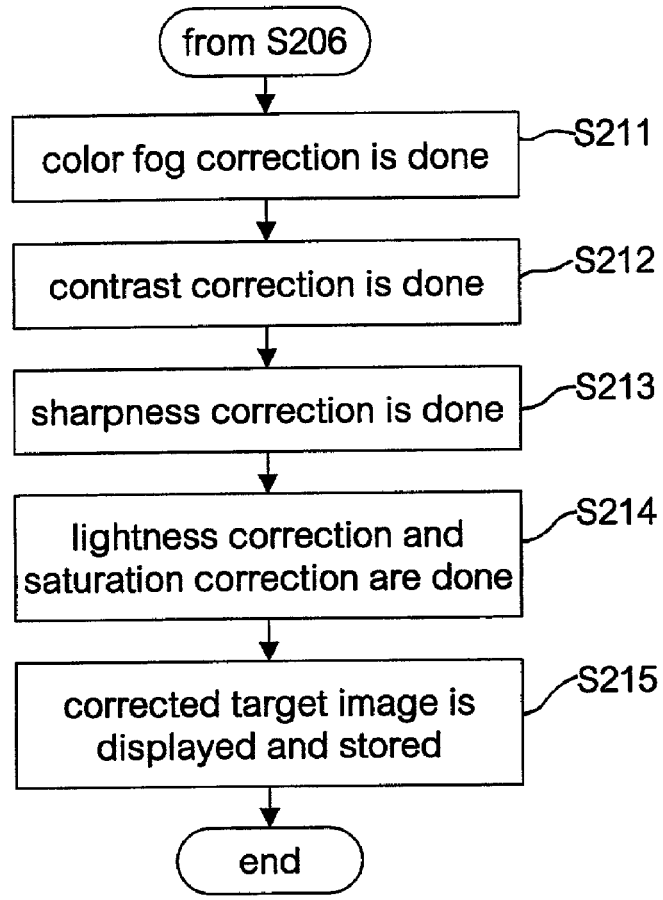
FIG. 12 is a flow chart of part of the image correction routine (second embodiment)
Figure 13:
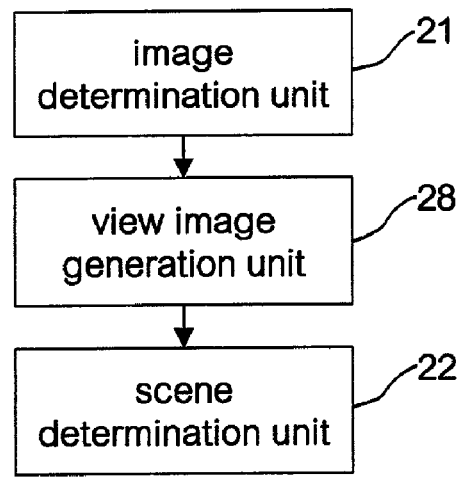
FIG. 13 is a block diagram showing the addition of a view image generating unit.

<Second embodiment> An embodiment that is essentially identical to the first embodiment but that uses a view image, which is a reduced target image, will be described as a second embodiment. FIGS. 11 and 12 are flow charts showing part of the image correction routine pertaining to the second embodiment. While the construction of the computer 1 is basically the same as the construction shown in FIG. 3, a view image generation unit 28 is added between the image determination unit 21 and the scene determination unit 22, as shown in FIG. 13.

In the second embodiment, after the image target is read and its type is identified (steps S201 and S202), a view image is generated by thinning some of the pixels of the image (or of each frame image in the case of a moving image) (step S203). In order to generate a view image for a moving image, further thinning of frame images themselves may also be carried out while paying attention to scene transitions. Through this operation, the number of frames in a moving image is also reduced.

Once a view image is generated, the same correction performed in the first embodiment is carried out regarding the view image. That is, scene determination (step S10), color fog correction (step S20), contrast correction (step S30) and sharpness correction (step S40) appropriate for a still image or a moving image are performed, and furthermore, lightness correction (step S204) and saturation correction (step S205) are carried out. Subsequently, a post-correction view image is displayed in the display 105 for confirmation (step S206).

When the post-correction view image has been confirmed, the original target image is sent out from the view image generation unit 28. Various types of correction are then performed by the color fog correction unit 23, the contrast correction unit 24, the sharpness correction unit 25, the lightness correction unit 26 and the saturation correction unit 27 (steps S211–S214). When this is done, the correction amount used for the correction of the view image is stored in each correction unit, so that correction is carried out by each correction unit using the correction amount stored therein. The post-correction target image is displayed in the display 105, and is stored in the fixed disk 104 where appropriate (step S215). Where frame images were removed from the view image of a moving image for thinning purposes, the correction amounts used for the frame images that were not removed are used on the frame images that were removed, while attention is paid to scene transitions.

As described above, because a view image is used in the second embodiment and the correction amount used in each type of correction is obtained based on the view image, the correction amounts may be generated quickly, offering speedy correction. In addition, the settings of the various parameters may be changed until a post-correction view image preferred by the user is created, and the correction of the target image may be subsequently carried out, which provides appropriate correction of the image.

<Third embodiment> In the second embodiment, the process in which correction amounts are sought and the process in which correction is actually performed are separated. Because the correction for moving images need not be as advanced as the correction for still images, and comprises uniform processing regarding each entire frame image, the various correction amounts may be directly calculated from the pre-correction view image. The quality of the post-correction moving image is essentially maintained even if this method is used.

Figure 14:
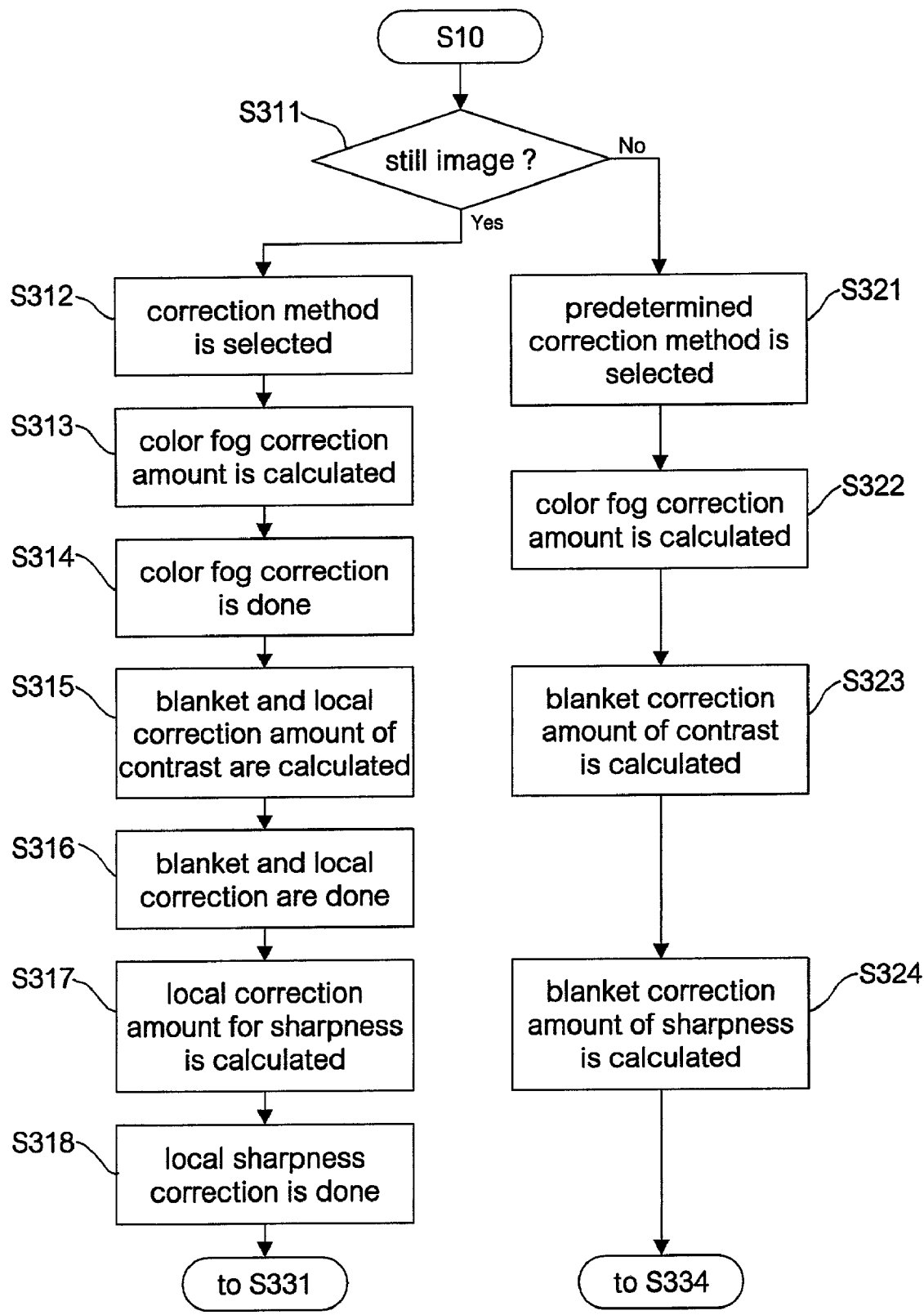
FIG. 14 is a flow chart of part of an image correction routine (third embodiment)
Figure 15:
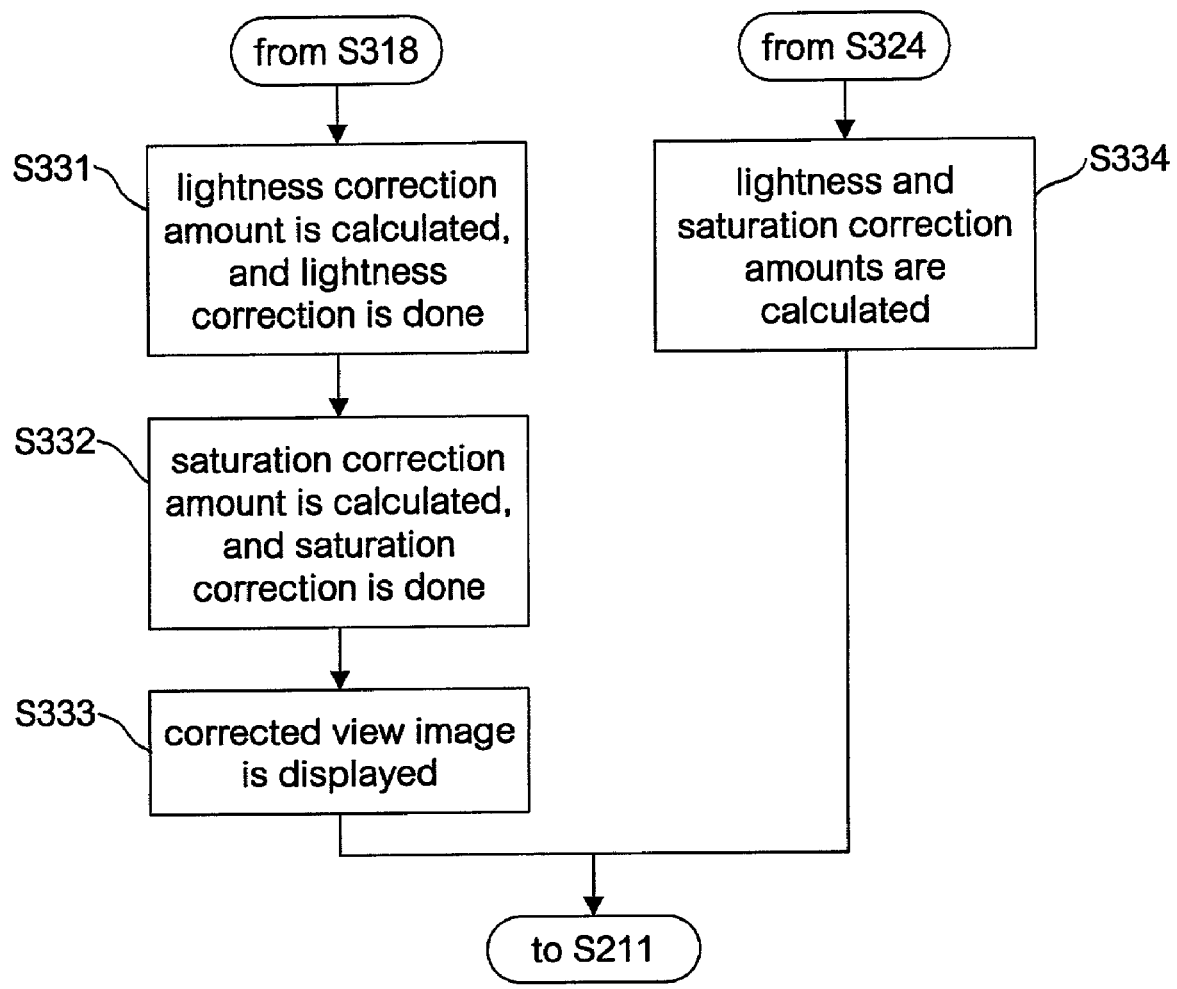
FIG. 15 is a flow chart of part of the image correction routine (third embodiment)

FIGS. 14 and 15 are flow charts of part of the image correction routine pertaining to the third embodiment. In the third embodiment, the various correction amounts are directly sought from the view image of a moving image, and the steps S20, S30, S40 and S204 through S206 (see FIG. 11) in the second embodiment are changed as shown in FIGS. 14 and 15. Other steps remain the same as in the second embodiment.

After the completion of scene determination, if the target image is a still image (step S311), corrections tailored for still images are carried out regarding the view image. Specifically, a color fog correction method is selected, the correction amount is calculated, and color fog correction is performed (steps S312–S314). Subsequently, the correction amounts for blanket contrast correction and local contrast correction are sought, and blanket contrast correction and local contrast correction are executed (steps S315 and S316).

Furthermore, skin areas are extracted, the local correction amount for sharpness correction is sought for each section, and sharpness correction takes place (steps S317 and S318). Finally, a lightness correction amount is sought, and lightness correction is performed, followed by the calculation of a saturation correction amount and execution of saturation correction (steps S331 and S332). The post-correction view image is displayed in the display 105 (step S333).

On the other hand, the view image is not corrected for a moving image. Only correction amounts are sequentially calculated. That is, the predetermined correction method is set in the correction unit 232 of the color fog correction unit 23 (step S321), and the color fog correction amount is sought (step S322). The contrast correction amount for each entire frame image of the view image is calculated by the contrast correction unit 24 (step S323), and the sharpness correction amount for each entire frame image of the view image is sought by the sharpness correction unit 25 (step S324). Subsequently, the light and saturation correction amounts are calculated by the lightness correction unit 26 and saturation correction unit 27, respectively (step S334).

In FIG. 14, for convenience, the steps pertaining to the view image of a still image are shown separately from the steps pertaining to the view image of a moving image. However, the steps for the view image of a still image are the same as those shown with reference to the second embodiment, and some of them are used for the calculation of correction amounts for moving images as well. Regardless of whether the target image is a still image or a moving image, once correction amounts are obtained, the steps S211 through S215 shown in FIG. 12 are carried out.

In order to carry out the processes described above, in the case of a moving image, the data obtained from the view image is directly input from the view image generation unit 28 to the color fog correction unit 23, the contrast correction unit 24, the sharpness correction unit 25, the lightness correction unit 26 and the saturation correction unit 27 shown in FIG. 3 incorporating FIG. 13. Where it is possible that the lightness correction unit 26 and saturation correction unit 27 may be substantially affected by the preceding processes, the correction amounts calculated by the preceding correction units may be input to the lightness correction unit 26 and the saturation correction unit 27.

As described above, in the third embodiment, where the target image is a still image, one set of correction operations is carried out with regard to the view image, and thereafter another set of correction operations is executed based on the post-correction view image. In the case of a moving image, the correction amount for each type of correction is calculated based on the pre-correction view image created from the moving image, and the various types of correction are subsequently carried out. Therefore, correction amounts regarding the moving image may be determined more quickly than in the second embodiment. In this case, however, the result of correction of the moving image cannot be checked beforehand. It is acceptable if the correction amounts are subject to adjustment following confirmation of the post-correction moving image. Furthermore, the various correction amounts for the moving image may be sought from the pre-correction moving image, as in the first embodiment, without generating a view image.

Figure 16:
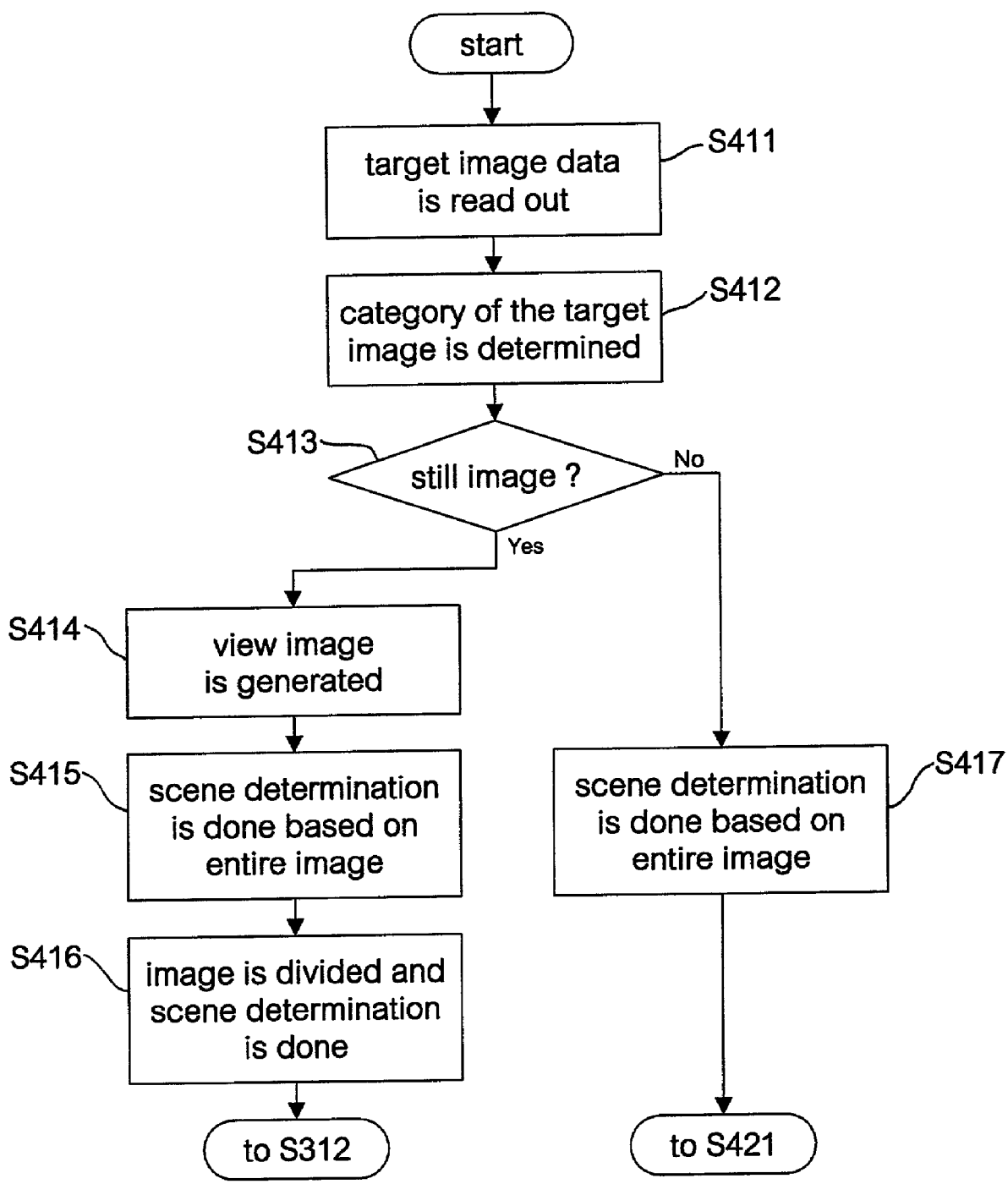
FIG. 16 is a flow chart of part of an image correction routine (fourth embodiment)
Figure 17:
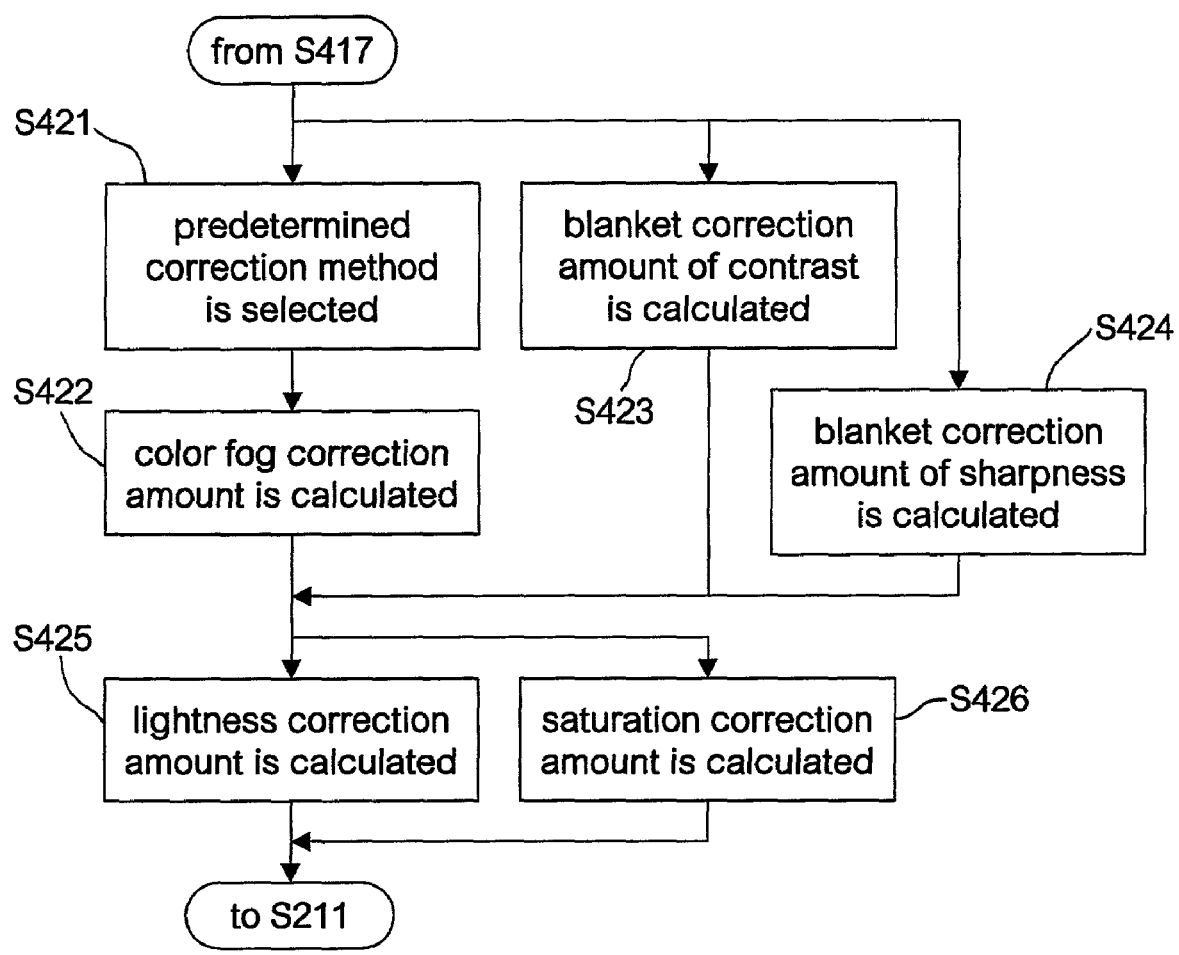
FIG. 17 is a flow chart of part of the image correction routine (fourth embodiment)

<Fourth embodiment> A view image is generated for either a still image or a moving image in the second and third embodiments, but it is also acceptable if a view image is created only for one type of image. In addition, correction amounts are calculated without correcting the view image of a moving image in the third embodiment, and it is also possible, in this case, for the calculations of the correction amounts to be made in a parallel fashion. A fourth embodiment, in which a view image is generated only for the correction of still images, and in which the correction amounts are calculated in a parallel fashion for the correction of moving images, will be described below. FIGS. 16 and 17 are flow charts showing part of the image correction routine pertaining to the fourth embodiment.

The target image is first read from the fixed disk 104, and the type of the image is identified (steps S411 and S412). In the case of a still image, a view image is generated (steps S413 and S414), and detailed scene determination, i.e., scene determination regarding the entire image and scene determination regarding each section, takes place (steps S414–S416). Subsequent processing follows in the same manner as in the third embodiment, i.e., calculation of the correction amounts using the view image, correction of the view image and correction of the still image (see FIGS. 14, 15 and 12).

In the case of a moving image, frame image scene determination is carried out for each entire frame image without a view image being generated (step S417). The various correction amounts are then sought without correction of the moving image. With reference to FIG. 17, the color fog correction amount, contrast correction amount and sharpness correction amount are calculated in a parallel fashion (steps S421–S424), and the lightness correction amount and saturation correction amount are also sought at the same time (steps S425 and S426). In FIG. 17, the routines to calculate the lightness correction amount and saturation correction amount do not take place in parallel with the other routines. Therefore, when these correction amounts are calculated, the color fog correction amount, contrast correction amount and/or sharpness correction amount may be used in such calculation. Once the correction amounts have been obtained, the various types of correction sequentially take place as with the second and third embodiments (see FIG. 12).

In the fourth embodiment, the various correction amounts for the moving image are sought at the same time. Consequently, the correction amounts for the moving image may be quickly obtained. Furthermore, in the fourth embodiment, a view image is generated for still images only, but it is also acceptable if the various types of correction are sequentially carried out for still images without the use of a view image. In either case, in the case of a still image, appropriate correction is provided through sequential execution of the various types of correction to the image (or the view image), and in the case of a moving image, the various correction amounts are essentially independently calculated, making it possible to speed up the process through the simultaneous calculation of multiple correction amounts.

Figure 18:
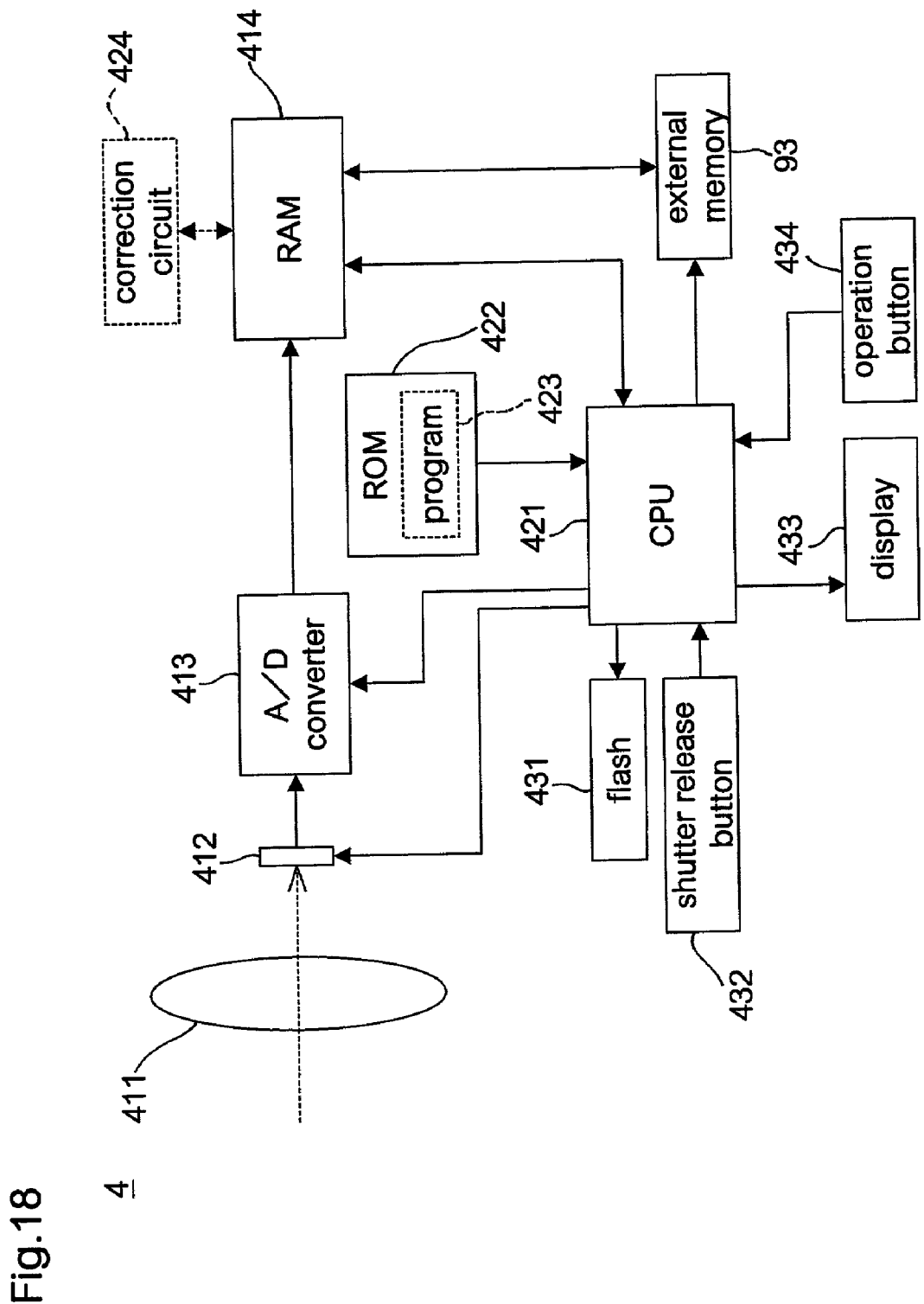
FIG. 18 is a block diagram showing the main components of a digital camera.

<Fifth embodiment> FIG. 18 is a block diagram showing the main components of a digital camera 4 pertaining to a fifth embodiment. The digital camera 4 has the functions of a digital still camera that captures still images, and the functions of a digital video camera that shoots moving images.

Of the components shown in FIG. 18, an image is captured using the lens system 411, the CCD 412, the A/D converter 413, the shutter release button 432, the CPU 421, the ROM 422 and the RAM 414. That is, the image of the object is formed on the CCD 412 by the lens system 411, and when the shutter release button 432 is pressed down, image signals from the CCD 411 are converted into digital image signals by the A/D converter 413. The digital image signals obtained as a result of the conversion by the A/D converter 413 are stored in the RAM 414 as image data. The control of these operations is performed by the CPU 421 operating in accordance with a program 423 stored in the ROM 422.

Where a still image is to be captured, the flash 431 is lit when appropriate and one image is taken. Where a moving image is to be captured, the image is continuously recorded while the shutter release button 432 is being pressed. Data compression can be carried out by the A/D converter 413. Once an image is captured, correction of the image is carried out by the CPU 421, ROM 422 and RAM 414. Specifically, the CPU 421 executes correction to the obtained image data while using the RAM 414 as a work area in accordance with the program 423 stored in the ROM 422. The external memory 93 is connected with the RAM 414 via a card slot, such that various data is transmitted therebetween based on the input operation from the operation button 434. The display 433 displays still images, moving images, information to the user and the like based on a signal from the CPU 421.

In the digital camera 4, a correction process is carried out regarding the target image stored in the RAM 414 by the CPU 421 using any one of the first through fourth embodiments. In other words, when the CPU 421 operates in accordance with the program 423, the image determination unit 21, the scene determination unit 22, the color fog correction unit 23, the contrast correction unit 24, the sharpness correction unit 25, the lightness correction unit 26, the saturation correction unit 27 and the view image generation unit 28 shown in FIGS. 3 and 13 perform their respective processing. Consequently, in the digital camera 4, appropriate correction regarding still images and moving images is provided while a number of the correction steps are shared between the two types of images. All of the correction steps in the digital camera 4 need not be carried out via software; some of them may be executed via a dedicated electric circuit. For example, the calculation of the correction amounts may be made via software, and the subsequent correction based on the correction amounts may be carried out by a correction circuit 424 connected to the RAM 414.

If the correction process in the first through fourth embodiments is provided via hardware, and if the automatic sequential operations in particular are carried out via hardware, the speed of the correction process is accelerated. For example, the calculation of a still image local correction amount and the execution of correction are made per section and comprise automatic sequential operations, as do the calculation of a correction amount and the execution of correction per frame image of a moving image. Therefore, if these operations are handled via pipeline processing, a further increase in speed may be provided. Furthermore, a correction circuit may be placed between the A/D converter 413 and the RAM 414, such that part of the correction process is executed via hardware to the extent possible.

<Modified examples> The above descriptions pertained to embodiments of the present invention, but the present invention is not limited to these embodiments and encompasses various modifications and alterations. According to the above embodiments, in contrast correction and sharpness correction, blanket correction is carried out at least for moving images and local correction is carried out for still images. This technique may be applied with regard to other types of correction as well. Various types of determinations may also be made available in scene determination. Other correction methods may be additionally included for color fog correction.

In the fifth embodiment, correction is performed by the CPU 421 that carries out the various operations in accordance with the program 423 in principle. It is acceptable, however, if the program 423 is not stored in the ROM 422 in advance and is read from the external memory 93 instead.

According to the embodiments described above, appropriate correction is offered with regard to both still images and moving images while some of the correction steps are shared therebetween. In addition, it is also possible to share more correction steps between still images and moving images. Furthermore, contrast correction and sharpness correction that are respectively suited to still images and moving images may be carried out, and the characteristics of a still image and a moving image may be identified using a technique that is suitable for the type of the target image. In addition, correction amounts for a moving image may be quickly calculated. Moreover, correction steps may be shared between still images and moving images while advanced correction for still images is provided.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A recording medium in which is stored a program that causes a computer to execute correction of still images and moving images, wherein when the program is executed by the computer, it causes the computer to perform a blanket correction routine in which an entire image undergoes uniform correction if a target image to be corrected is a moving image, and a local correction routine in which different respective areas of the image receive individual correction of the same type as the blanket correction if a target image is a still image.

2. A recording medium according to claim 1, wherein the blanket correction routine is also executed when the target image is a still image.

3. A recording medium according to claim 1, wherein the correction includes contrast correction.

4. A recording medium according to claim 1, wherein the correction includes sharpness correction.

5. A recording medium according to claim 1, wherein when the program is executed by the computer, it causes the computer to perform a routine to identify characteristics of the image based on the pixel values of the entire image if the target image is a moving image, and a routine to identify characteristics of the image based on pixel values of each section of the image if the target image is a still image.

6. A recording medium in which is stored a program that causes a computer to execute correction of still images and moving images, wherein when the program is executed by the computer, it causes the computer to execute a routine to carry out correction after selecting at least one correction method from among multiple methods for a given type of correction if the target image to be corrected is a still image, and a routine to carry out correction using a predetermined one of said multiple correction methods if the target image is a moving image.

7. A recording medium according to claim 6, wherein the given type of correction is color fog correction.

8. An image correction apparatus that performs correction of still images and moving images, the apparatus including blanket correction means for performing uniform correction of an entire image if a target image to be corrected is a moving image, and local correction means for performing individual correction of the same type as the blanket correction on plural respective areas of the image if a target image is a still image.

9. An image correction apparatus that performs correction of still images and moving images, including correction means that is capable of carrying out correction of an image using multiple methods for a given type of correction, and control means for controlling the correction means, wherein the control means selects at least one correction method from among the multiple correction methods for said given type of correction and causes the correction means to execute correction if the target image to be corrected is a still image, and causes the correction means to perform correction using a predetermined one of the multiple correction methods if the target image is a moving image.

10. An image correction method comprising the steps of:
determining whether an image designated as a target image is a moving image or a still image based on image data of the designated image;
performing a first correction to certain sections of the designated image if the designated image is a still image; and
performing a second correction, which is a simplified version of the first correction routine, to the entire designated image if the designated image is a moving image.

11. An image correction method according to claim 10, wherein the certain sections comprise human skin areas.

12. An image correction method according to claim 10, wherein the first correction includes a routine for dividing the entire image into multiple sections and performing correction for each section.

13. An image correction apparatus comprising:
blanket correction means for performing uniform correction to the entire image if the image to be corrected is a moving image; and
local correction means for performing correction of the same type as said uniform correction to plural individual areas of the image if the image to be corrected is a still image.

14. The recording medium of claim 6, wherein said at least one correction method is selected on the basis of characteristics of the still image.

15. The image correction apparatus of claim 9, wherein said control selects said one correction method on the basis of characteristics of the still image.

* * * * *